Patented June 6, 1939

2,161,328

UNITED STATES PATENT OFFICE 2,161,328

NONDUSTING CALCIUM CYANAMIDE AND A PROCESS OF PREPARING SAME

Ernst Winter, Braunsfeld, Cologne, and Herbert Polack, Knapsack, Cologne, Germany, assignors to Aktiengesellschaft für Stickstoffdünger, Knapsack, near Cologne-on-the-Rhine, Germany No Drawing. Application October 27, 1936, Serial No. 107,906. In Germany August 15, 1931

6 Claims. (Cl. 23—78)

The present invention relates to non-dusting calcium cyanamide and to a process of preparing same.

Calcium cyanamide is generally made on a large scale by causing finely pulverized calcium carbide loosely piled in a large container to react with an atmosphere of nitrogen either by external heating or by internal initial ignition. The strongly exothermic reaction thus started between calcium carbide and nitrogen is transmitted after the ignition in an irresistible and uncontrollable manner through the whole mass. Owing to the course of the reaction constantly increasing in violence and to the large amount of heat produced during this reaction, the temperature of the mass rises to such a degree that the whole soon becomes viscous and, on cooling, solidifies to a block which is as hard as stone.

This method of making calcium cyanamide is characterized by the quick course which can no longer be controlled, furthermore by the mass thereby becoming viscous and agglomerating and finally by the solidification to a hard block. This hard block has then to be comminuted, involving considerable costs, in order to obtain the calcium cyanamide in the desired pulverulent condition in which it has to be present in order to be suitable for its main use as an artificial fertilizer.

We have now found that the process can be rendered controllable and the undesirable agglomeration of the mass can be completely avoided by using the calcium carbide in a granular form, keeping it constantly in motion and starting the combination with nitrogen slowly at a low temperature and raising this temperature gradually to the required final degree so that at every stage an agglomeration of the material, owing to too large an amount of heat being evolved, is avoided. The granulated calcium carbide may be allowed to have admixed thereto up to 50 per cent of its weight of calcium carbide in the form of dust and it is advantageous to add to the material one of the known catalysts exerting a favorable action on the combination of calcium carbide with nitrogen. These catalysts may be calcium chloride, calcium fluoride (fluor spar) or calcium cyanamide. It is thus possible to control the temperature during the process to obtain a very high yield and to moderate the course in any desired manner. The calcium carbide is no longer transformed into a viscous mass and the calcium cyanamide obtained consequently remains in the same finely divided form in which the calcium carbide has been introduced into the device, until the absorption of nitrogen is complete.

The granular size of the calcium carbide, the constant motion of the calcium carbide and the constant control of the temperature by cooling or addition of heat are the important factors of the new process. The granular size in which the calcium carbide is introduced into the device may vary within rather wide limits—the diameter of a grain may, for instance, vary between 0.3 mm. and 4 mm.—but the size is not limited thereto and may be larger if it is not intended completely to transform the calcium carbide into calcium cyanamide throughout the whole grain. It is, for instance, not advisable to go too far below the limit of 0.3 mm. diameter because the velocity of the reaction between calcium carbide and nitrogen increases pari passu with the increase of fineness of the grain. The calcium carbide to be treated may, however, contain a certain amount of calcium carbide in the form of dust—i. e., grains of a size of less than 0.3 mm.—the quantity being allowed to amount up to 50 per cent. In general the following statements as to the steps to be taken can be given:

The more finely ground the calcium carbide, the quicker the reaction, the more careful one must be in allowing the temperature to increase. The coarser the granulation of the calcium carbide used, the slower is the progress of the absorption of nitrogen and the more quickly in general may be the increase of the temperature; at the same time the longer will be the absorption of nitrogen at a high temperature, for instance at about 950° C.–1050° C., in order to terminate the operation. If, for instance, the granular size of the calcium carbide is ½ to 1 mm., and if the mass contains 10–20 per cent. of pulverized calcium carbide, the absorption of nitrogen must be very carefully regulated at the beginning at 650° C. When, however, about half of the calcium carbide used has been transformed into calcium cyanamide, the temperature may be raised more quickly, that is to say, the nitrogen may be supplied more quickly. If a granular size of 1–3 mm. is used, the temperature may be increased relatively quickly in the beginning, but the operation at a raised temperature must be prolonged in order to complete the conversion to cyanamide.

It is known that the more finely the calcium carbide is ground, the more violent generally is its transformation into calcium cyanamide. If, however, the calcium carbide which advantageously is constantly kept in motion, is not ignited at the usual temperature, but is heated only to about 650° C., the combination with nitrogen gradually sets in as soon as the nitrogen is conducted over the finely ground calcium carbide. The temperature is maintained at 650° C. until the absorption of nitrogen which first has become violent, abates again. The temperature is then raised by about 50° C. to about 700° C. The raising of the temperature may be effected by addition of heat from outside (heating) or by an increased addition of nitrogen whereby a stronger reaction and consequently an increase of temperature takes place. Again the absorption of nitrogen increases but decreases again after a short time. When the amount of nitrogen which can still be absorbed at this temperature, has been absorbed, the temperature is again raised by 50° C. and this method of working is continued until the temperature has attained 950° C.–1050° C.; this is sufficient to complete the process. In higher temperature ranges (850° C. and more) addition of heat from outside is always required if the temperature has to be increased. If the operation is conducted in this manner and if too rapid increase of the temperature is avoided, a product of a uniform granular size is obtained and an agglomeration of the mass does not occur.

As the calories evolved depend upon the amount of nitrogen absorbed in a certain time, the process may just as well be regulated by the quantity of nitrogen added in a certain time. In this case it is not permissible to conduct, as above described, any desired quantity of nitrogen over the material to be treated, but a certain quantity of nitrogen is introduced, for instance, into a drum in which the calcium carbide is kept in a continuous motion. The quantity of nitrogen has to be adapted to that of the calcium carbide so that by the amount of heat developed the temperature is raised only very gradually. The drum may be closed, but it is provided with some means for periodic escape of any inert gases. In this operation also the absorption of nitrogen may start at about 650° C. The heat liberated during the reaction gradually raises the temperature of the mass and the velocity of the absorption of nitrogen can be exactly controlled by the quantity of nitrogen supplied. After about 20 hours a temperature of about 1000° C. is attained, at which temperature the absorption of nitrogen is completed. The principal condition is the gradual increase of the temperature. If, particularly in the beginning, the temperature is raised too quickly by too rapid an absorption of the nitrogen, an agglomeration of the mass cannot be avoided.

Other auxiliary means are likewise suitable for assisting substantially the regulation of the temperature. By a suitable use of these means it may be possible completely to dispense with the addition of heat and to attain that the process is wholly carried out by the heat which is set free until the calcium carbide is completely transformed into calcium cyanamide. These means are, for instance, the dilution of the nitrogen with inert gases or, in case pure nitrogen is used, the dilution of the calcium carbide with calcium cyanamide or with some other diluent, for instance lime. If this method of working is adopted, it is unnecessary to be as cautious in the increase of the temperature as if substantially pure materials are used.

The process may also easily be carried out in a continuous manner. The process is carried out by starting it at a low temperature and by continuously introducing new, granulated calcium carbide into the drum as soon as about two thirds of the calcium carbide have been transformed into calcium cyanamide. But care has to be taken that in the part of the drum where the new calcium carbide enters the temperature is kept for 100° C.–200° C. lower than in that part of the drum where the finished material continuously leaves the drum which is kept in motion. In that latter part the temperature has to be maintained as high as possible in order to attain a complete combination with the nitrogen.

When the process is thus carried out in a continuous manner in the revolving tubular kiln there must be observed about the following times and temperatures of reaction which are calculated for furnaces of technical dimensions, i. e. of a length of about 8 to 15 meters and with diameters of about 1 meter and more. The highest temperature of about 1050° C. is obtained in such furnaces about in the middle of the revolving tube or shortly before. If a granulated carbide of a granular size of 0.3 to 4 millimeter is used the migration velocity of the material and the reflection power of the wall of the furnace is chosen in such a manner that the material is gradually heated within at least 3 hours to the said highest temperature, the temperature of the material near the inlet amounting to about 650° C. The said highest temperature of about 1050° C. then gradually decreases, for instance, within the same time which was applied for heating the material and corresponds at the end, near the outlet, to about the temperature near the inlet of about 650° C.

When pulverulent portions are mixed with the reaction material the time necessary for attaining the highest temperature must be increased. When 15 per cent of dust are contained in the reaction material at least 4 hours, preferably about 6 to 7 hours, are necessary. If the granulated carbide contains 50 per cent of dust the time for heating the material rises to about 10 to 12 hours.

The non-dusting calcium cyanamide thus made is obtained in the form of granules, each granule having a fritted surface and a grayish to black color. It differs from the granulated material hitherto obtained by imperfect processes by the fact that it completely nitrogenized and therefore contains also in the interior no parts of unchanged carbide. Experiments have already been made to give hydrated cyanamide in powder form the form of granules by impregnating it with solutions of binders, for instance, calcium nitrate. Such products contain besides the calcium cyanamide also the binding agent. In contradistinction thereto the products obtained according to our process contain no foreign substances such as binders but are of a completely homogeneous structure.

The following examples serve to illustrate the invention, but they are not intended to limit it thereto:

1. 2000 grams of calcium carbide in form of gravel—comprising all granular sizes of a diameter between 0.5 and 1 mm.—are mixed with 100 grams of pulverized calcium chloride (catalyst) and the mixture is heated to 650° C. in a drum of nichrotherm steel of about 6.3 liters capacity, while slowly rotating the drum. The absorption of nitrogen which starts at this temperature is measured. Every 4 hours the temperature is raised by 50° C. and during this time it is maintained constant.

There are obtained about 2600 grams of granulated calcium cyanamide containing 22 per cent. of N and 0.25 per cent. of residual calcium carbide. The duration of operation is 32 hours.

2. 30 kilos of calcium carbide in the form of gravel—comprising all granular sizes between 0.5 and 1 mm.—are mixed with 1.5 kilos of pulverized calcium chloride (catalyst) and the mixture is heated to 600° C. in a cylindrical drum of nichrotherm steel, while slowly rotating the drum. The absorption of nitrogen begins at 615° C., the temperature is gradually increased in this case corresponding with the quantity of nitrogen absorbed.

There are obtained about 40 kilos of granulated calcium cyanamide containing 21.7 per cent. of nitrogen and 0.1 per cent. of residual calcium carbide. Duration of experiment: 19 hours.

3. 3000 grams of calcium carbide comprising all granular sizes of 0 to 4 mm. diameter are mixed with 90 grams of pulverized calcium chloride (catalyst) and the mixture is combined with nitrogen in the course of 24 hours at a temperature gradually raised to 1050° C.

There are obtained about 3800 grams of granulated calcium cyanamide containing 20.2 per cent. of N and 0.1 per cent. of residual calcium carbide.

4. 30 kilos of calcium carbide—comprising all granular sizes between 0.5 and 3 mm. diameter—are mixed with 1.5 kilos of pulverized calcium chloride (catalyst) and the mixture is combined with nitrogen in the course of 60 hours at a temperature gradually raised to 1050° C.

There are obtained about 39 kilos of granulated calcium cyanamide containing 22 per cent. of N and 0.75 per cent. of residual calcium carbide.

5. 30 kilos of calcium carbide comprising all granular sizes between 0.5 and 22 mm. diameter are mixed with 1.5 kilos of pulverized calcium chloride (catalyst) and the mixture is combined with nitrogen in the course of 56 hours at a temperature gradually raised to 1040° C.

There are obtained about 39.5 kilos of granulated calcium cyanamide containing 22.4 per cent. of N and 0.1 per cent. of residual calcium carbide.

6. In order to make calcium cyanamide in a continuous manner 30 kilos of calcium carbide—comprising all granular sizes between 0.3 and 1 mm. diameter, mixed with 1.5 kilos of pulverized calcium chloride (catalyst), are introduced into a drum as described above. The mixture is combined with nitrogen as described in the preceding examples until the temperature has increased to about 780° C. A fresh mixture of calcium carbide and calcium chloride is then introduced and the temperature at the inlet of the drum is kept at about 780°–800° C., whereas the temperature at the outlet of the drum is regulated to about 1000° C.

By means of this operation about 1 kilo of calcium carbide can be combined with nitrogen in the course of 1 hour in a continuous manner.

7. 30 kilos of calcium carbide—comprising all granular sizes of a diameter between 0.5 and 1 mm.—are mixed with 1.5 kilos of pulverized calcium fluoride (catalyst) and the mixture is combined with nitrogen in the course of 51 hours at a temperature gradually raised to 1070° C.

There are obtained about 39.5 kilos of granulated calcium cyanamide containing 22.7 per cent. of N and 0.1 per cent. of residual calcium carbide.

8. 500 grams of granulated calcium cyanamide containing 20.5 per cent. of N are introduced into a drum of 6.3 liters capacity. There is then added in the course of 8 hours at a temperature of 950° C., by portions of 100 grams, a mixture of 2 kilos of calcium carbide comprising the granular sizes of a diameter of between 0.3 and 0.6 mm. and 40 grams of calcium chloride (catalyst). The temperature is then raised within 6 hours to 1050° C.

There are obtained 3.06 kilos of granulated calcium cyanamide containing 21.2 per cent. of N and 0.2 per cent. of $CaC_2$.

This application is a continuation in part of the co-pending application Serial No. 620,446 filed July 1, 1932.

We claim:

1. The process of preparing calcium cyanamide in granular form which comprises causing nitrogen to act upon finely granulated calcium carbide of a granular size of 0.3 to 4 millimeters which is constantly kept in motion the absorption of nitrogen being started at a low reaction temperature and the temperature being controlled so that the calcium carbide is heated gradually for at least 3 hours to the final temperature sufficient to completely convert the calcium carbide to calcium cyanamide, the rate of nitrogen supply, the temperature of the reaction and the granular size of the calcium carbide being so correlated that no agglomeration of the material takes place.

2. The process of preparing calcium cyanamide in a granular form which comprises causing nitrogen to act upon calcium carbide at least 50 per cent of which are in the form of grains having a granular size of 0.3 to 4 millimeters, the remainder being in the form of dust the calcium carbide being constantly kept in motion, the absorption of nitrogen being started at a low reaction temperature and the temperature being controlled so that the calcium carbide is heated gradually for at least 4 hours to the final temperature sufficient to completely convert the calcium carbide to calcium cyanamide, the rate of nitrogen supply, the temperature of the reaction and the granular size of the calcium carbide being so correlated that no agglomeration of the material takes place.

3. The process of preparing calcium cyanamide in granular form which comprises causing nitrogen to act upon finely granulated calcium carbide of a granular size of 0.3 to 4 millimeters which is constantly kept in motion the absorption of nitrogen being started at about 650° C. and the temperature being controlled so that the calcium carbide is heated gradually for at least 3 hours to a final temperature of about 1050° C. and then gradually decreasing the temperature of the reaction mixture for about 3 hours, the rate of nitrogen supply, the temperature of the reaction and the granular size of the calcium carbide being so correlated that no agglomeration of the material takes place.

4. The process of preparing calcium cyanamide in a granular form which comprises causing nitrogen to act upon calcium carbide at least 50 per cent of which are in the form of grains having a granular size of 0.3 to 4 millimeters, the remainder being in the form of dust the calcium carbide being constantly kept in motion, the absorption of nitrogen being started at about 650°

C. and the temperature being controlled so that the calcium carbide is heated gradually for at least 4 hours to a final temperature of about 1050° C. and then gradually decreasing the temperature of the reaction mixture for about 4 hours, the rate of nitrogen supply, the temperature of the reaction and the granular size of the calcium carbide being so correlated that no agglomeration of the material takes place.

5. The process of preparing calcium cyanamide in a granular form in a continuous manner which comprises introducing granulated calcium carbide of a granular size of 0.3 to 4 millimeters into the inlet of a reaction zone, keeping the calcium carbide constantly agitated, introducing nitrogen and regulating the temperature of the reacting material so that it rises from about 650° C. at the inlet, increases gradually for at least 3 hours as the material progresses through the reaction zone to a temperature of about 1050° C. and decreases gradually for about 3 hours to about 650° C. near the outlet, the rate of nitrogen supply, the temperature of the reaction and the granular size of the calcium carbide being so correlated that no agglomeration of the material takes place.

6. The process of preparing calcium cyanamide in a granular form in a continuous manner which comprises introducing calcium carbide at least 50 per cent of which are in the form of grains having a granular size of 0.3 to 4 millimeters the remainder being in the form of dust into the inlet of a reaction zone, keeping the calcium carbide constantly agitated, introducing nitrogen and regulating the temperature of the reacting material so that it rises from about 650° C. at the inlet, increases gradually for at least 4 hours as the material progresses through the reaction zone to a temperature of about 1050° C. and decreases gradually for about 4 hours to about 650° C. near the outlet, the rate of nitrogen supply, the temperature of the reaction and the granular size of the calcium carbide being so correlated that no agglomeration of the material takes place.

ERNST WINTER.
HERBERT POLACK.